(12) United States Patent
Sanyal et al.

(10) Patent No.: US 8,982,744 B2
(45) Date of Patent: Mar. 17, 2015

(54) METHOD AND SYSTEM FOR A SUBBAND ACOUSTIC ECHO CANCELLER WITH INTEGRATED VOICE ACTIVITY DETECTION

(75) Inventors: Sumit Sanyal, Menlo Park, CA (US); Wilfrid LeBlanc, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 1005 days.

(21) Appl. No.: 11/758,928

(22) Filed: Jun. 6, 2007

(65) Prior Publication Data
US 2008/0306736 A1  Dec. 11, 2008

(51) Int. Cl.
| | |
|---|---|
| H04B 3/20 | (2006.01) |
| G10L 19/00 | (2013.01) |
| H04M 9/08 | (2006.01) |
| H04W 52/28 | (2009.01) |
| G10L 25/78 | (2013.01) |

(52) U.S. Cl.
CPC .......... *G10L 19/0019* (2013.01); *H04M 9/085* (2013.01); *H04W 52/287* (2013.01); *G10L 25/78* (2013.01)
USPC ...................................................... 370/286

(58) Field of Classification Search
USPC ......... 370/286, 320, 289, 208, 335, 342, 441, 370/311, 337, 310, 338, 344, 401, 328; 379/406, 388, 56, 217, 341, 238, 417; 375/260, 241, 346, 141; 704/200, 233, 704/215, 231, 224; 705/38, 37, 35, 1, 80; 455/450, 522, 41, 570, 79, 226, 69, 455/557, 343; 345/156; 340/815; 725/131; 241/36
See application file for complete search history.

(56) References Cited

U.S. PATENT DOCUMENTS

| | | | | |
|---|---|---|---|---|
| 4,450,319 | A * | 5/1984 | Lucey | 379/56.3 |
| 4,649,543 | A * | 3/1987 | Levine | 714/774 |
| 4,876,740 | A * | 10/1989 | Levine et al. | 455/422.1 |
| 5,479,474 | A * | 12/1995 | Schwartzman et al. | 455/570 |
| 5,602,913 | A * | 2/1997 | Lee et al. | 379/406.06 |
| 5,703,874 | A * | 12/1997 | Schilling | 370/335 |
| 5,721,772 | A * | 2/1998 | Haneda et al. | 379/406.14 |
| 5,802,109 | A * | 9/1998 | Sano | 375/245 |
| 5,809,061 | A * | 9/1998 | Shea et al. | 375/141 |
| 5,844,994 | A * | 12/1998 | Graumann | 381/56 |
| 5,867,794 | A * | 2/1999 | Hayes et al. | 455/557 |
| 6,097,772 | A * | 8/2000 | Johnson et al. | 375/346 |
| 6,141,339 | A * | 10/2000 | Kaplan et al. | 370/395.61 |

(Continued)

*Primary Examiner* — Hassan Phillips
*Assistant Examiner* — Prenell Jones
(74) *Attorney, Agent, or Firm* — Oblon, McClelland, Maier & Neustadt, L.L.P.

(57) ABSTRACT

Methods and systems for a subband acoustic echo canceller with integrated voice activity detection are disclosed and may include adjusting transmit and/or receive powers of wirelessly communicated audio signals based on voice activity detection via subband analysis of the wirelessly communicated audio signals. The receive power may be adjusted by utilizing a reduced duty cycle, or by conveying voice activity detection information via an asynchronous control channel in a Bluetooth application. A plurality of subbands may be generated utilizing a fast Fourier transform, and a first subset of the subbands corresponding to voice activity may be selected and a second subset of the subbands may be selected that corresponds to background noise. The processing of the subsets may be dynamically adjusted due to variations in the voice activity or background noise. Comfort noise may be generated and transmitted at a reduced bandwidth utilizing the second subset of the subbands.

35 Claims, 5 Drawing Sheets

(56) References Cited

U.S. PATENT DOCUMENTS

| | | | |
|---|---|---|---|
| 6,154,484 A * | 11/2000 | Lee et al. | 375/130 |
| 6,233,439 B1 * | 5/2001 | Jalali | 455/127.2 |
| 6,278,701 B1 * | 8/2001 | Ayyagari et al. | 370/335 |
| 6,282,430 B1 * | 8/2001 | Young | 455/522 |
| 6,360,085 B1 * | 3/2002 | Walley | 455/226.2 |
| 6,467,092 B1 * | 10/2002 | Geile et al. | 725/131 |
| 6,591,110 B1 * | 7/2003 | Kim et al. | 455/453 |
| 6,711,380 B1 * | 3/2004 | Callaway, Jr. | 455/41.2 |
| 6,724,735 B1 * | 4/2004 | Gibbs et al. | 370/280 |
| 6,731,614 B1 * | 5/2004 | Ohlson et al. | 370/320 |
| 6,763,060 B1 * | 7/2004 | Knapp | 375/219 |
| 6,785,339 B1 * | 8/2004 | Tahernezhaadi et al. | 375/241 |
| 6,931,373 B1 * | 8/2005 | Bhaskar et al. | 704/230 |
| 6,993,011 B1 * | 1/2006 | Kaplan et al. | 370/352 |
| 7,002,920 B1 * | 2/2006 | Ayyagari et al. | 370/252 |
| 7,027,788 B2 * | 4/2006 | Walley | 455/226.2 |
| 7,464,029 B2 * | 12/2008 | Visser et al. | 704/210 |
| 7,860,235 B2 * | 12/2010 | Sudo et al. | 379/406.01 |
| 8,050,398 B1 * | 11/2011 | Xu | 379/392 |
| 8,244,523 B1 * | 8/2012 | Murphy | 704/205 |
| 8,311,814 B2 * | 11/2012 | Ong et al. | 704/215 |
| 2001/0033562 A1 * | 10/2001 | Schilling | 370/342 |
| 2002/0055342 A1 * | 5/2002 | Walley | 455/226.2 |
| 2002/0057791 A1 * | 5/2002 | Piket et al. | 379/417 |
| 2002/0120439 A1 * | 8/2002 | Mekuria et al. | 704/215 |
| 2002/0120440 A1 * | 8/2002 | Zhang | 704/215 |
| 2002/0154761 A1 * | 10/2002 | McLaughlin et al. | 379/388.01 |
| 2002/0156622 A1 * | 10/2002 | Hirsch et al. | 704/220 |
| 2002/0165718 A1 * | 11/2002 | Graumann et al. | 704/270 |
| 2003/0058929 A1 * | 3/2003 | Cox et al. | 375/150 |
| 2003/0063759 A1 * | 4/2003 | Brennan et al. | 381/92 |
| 2003/0112758 A1 * | 6/2003 | Pang et al. | 370/235 |
| 2003/0117368 A1 * | 6/2003 | Pedersen | 345/156 |
| 2003/0179888 A1 * | 9/2003 | Burnett et al. | 381/71.8 |
| 2003/0194029 A1 * | 10/2003 | Heinonen et al. | 375/345 |
| 2003/0198203 A1 * | 10/2003 | Antonio et al. | 370/329 |
| 2003/0228023 A1 * | 12/2003 | Burnett et al. | 381/92 |
| 2004/0002856 A1 * | 1/2004 | Bhaskar et al. | 704/219 |
| 2004/0013252 A1 * | 1/2004 | Craner | 379/142.01 |
| 2004/0133421 A1 * | 7/2004 | Burnett et al. | 704/215 |
| 2004/0137969 A1 * | 7/2004 | Nassimi | 455/575.2 |
| 2004/0234069 A1 * | 11/2004 | Mikesell et al. | 379/406.01 |
| 2005/0055116 A1 * | 3/2005 | Isaka et al. | 700/94 |
| 2005/0192798 A1 * | 9/2005 | Vainio et al. | 704/223 |
| 2005/0240399 A1 * | 10/2005 | Makinen | 704/223 |
| 2005/0246164 A1 * | 11/2005 | Ojala et al. | 704/205 |
| 2006/0002547 A1 * | 1/2006 | Stokes et al. | 379/406.14 |
| 2006/0007872 A1 * | 1/2006 | Liu | 370/286 |
| 2006/0023871 A1 * | 2/2006 | Shaffer et al. | 379/420.01 |
| 2006/0046767 A1 * | 3/2006 | Hunzinger | 455/522 |
| 2006/0093026 A1 * | 5/2006 | Montojo et al. | 375/225 |
| 2006/0120537 A1 * | 6/2006 | Burnett et al. | 381/71.6 |
| 2006/0224382 A1 * | 10/2006 | Taneda | 704/233 |
| 2006/0229090 A1 * | 10/2006 | LaDue | 455/507 |
| 2006/0238368 A1 * | 10/2006 | Pederson et al. | 340/815.45 |
| 2006/0270347 A1 * | 11/2006 | Ibrahim et al. | 455/41.2 |
| 2007/0082612 A1 * | 4/2007 | Valve et al. | 455/41.2 |
| 2008/0067270 A1 * | 3/2008 | Strutz | 241/36 |
| 2008/0071531 A1 * | 3/2008 | Ong et al. | 704/231 |
| 2008/0091415 A1 * | 4/2008 | Schafer | 704/200.1 |
| 2008/0130917 A1 * | 6/2008 | Kong et al. | 381/107 |
| 2008/0132294 A1 * | 6/2008 | Bennett et al. | 455/569.1 |
| 2008/0153556 A1 * | 6/2008 | Oh | 455/570 |
| 2008/0285500 A1 * | 11/2008 | Zhang et al. | 370/315 |
| 2009/0043577 A1 * | 2/2009 | Godavarti | 704/233 |
| 2009/0068974 A1 * | 3/2009 | Smith | 455/304 |
| 2009/0190513 A1 * | 7/2009 | Islam et al. | 370/311 |
| 2010/0128881 A1 * | 5/2010 | Petit et al. | 381/56 |
| 2011/0282676 A1 * | 11/2011 | LeBlanc et al. | 704/500 |
| 2012/0069989 A1 * | 3/2012 | Lambert | 379/406.08 |

* cited by examiner

METHOD AND SYSTEM FOR A SUBBAND ACOUSTIC ECHO CANCELLER WITH INTEGRATED VOICE ACTIVITY DETECTION

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to audio signal processing. More specifically, certain embodiments of the invention relate to a method and system for a subband acoustic echo canceller with integrated voice activity detection.

BACKGROUND OF THE INVENTION

Bluetooth is an international open standard that allows devices to wirelessly communicate with each other. Bluetooth is a short-range wireless technology that allows Bluetooth enabled devices such as computers, cell phones, keyboards and headphones to establish connections without using wires or cables to couple the devices to each other. Bluetooth is currently incorporated into numerous commercial products including desktop computers, laptops, PDAs, cell phones, keyboards, headsets and printers, with more products being constantly added to the list of Bluetooth enabled devices.

The Bluetooth subband codec (SBC) is a low computational complexity audio coding system designed to provide high quality audio at moderate bit rates to Bluetooth enabled devices. The Bluetooth SBC system utilizes a cosine modulated filterbank, for example, for analysis and synthesis. The filterbank may be configured for 4 subbands or 8 subbands, for example. The subband signals may be quantized using a dynamic bit allocation scheme and block adaptive pulse code modulation (PCM) quantization. The number of bits available and the number of bits used for quantization may vary, thereby making the overall bit-rate of the SBC system variable or adjustable. This is advantageous for use in wireless applications where the available wireless bandwidth for audio, and the maximum possible bit-rate may vary over time.

The Bluetooth community has developed various specifications that define how to use streaming audio over a Bluetooth link. This opens up Bluetooth technology to a whole new class of audio devices, such as wireless stereo headsets, wireless speakers, and wireless portable MP3 players. With the introduction of new Bluetooth specifications for streaming audio, new Bluetooth products such as wireless stereo headsets and wireless file streaming applications are becoming a reality. Wireless applications require solutions that are increasingly low power in order to extend battery life and provide a better end user experience. With existing systems, the computational requirements of high fidelity audio coding may make it cost prohibitive and challenging to add features such as streaming music to some wireless devices especially mobile devices.

Packet based telephony such as Internet Protocol (IP) telephony may provide an alternative to conventional circuit switched telephony, the latter of which may typically require the establishment of an end-to-end communication path prior to the transmission of information. In particular, IP telephony permits packetization, prioritization and/or simultaneous transmission of voice traffic and data without requiring the establishment of an end-to-end communication path. IP telephony systems may capitalize on voice over packet (VoP) technologies, which may provide a means by which voice, video and data traffic may be simultaneously transmitted across packet networks. The data may include video data.

Voice quality (VQ) is a metric, which may be used to define a qualitative and/or quantitative measure regarding the quality and/or condition of a received voice signal. Voice clarity may be an indicator of the quality or condition of a voice signal. Voice quality may be an important metric that may ultimately dictate a quality of service (QoS) offered by a network service provider. The following factors, for example, may affect the voice quality and/or condition of a voice signal—noise, echo, and delay or packet latency. However, the effects of these factors may be cumulative. In this regard, factors such as delay and latency may exacerbate the effects of echo, for example. Delays that may affect the voice quality may include, but are not limited to, routing, queuing and processing delays.

Various VoP specifications, recommendations and standards have been created to ensure interoperability between various network components, and to create an acceptable QoS which may include voice quality. For example, the International Telecommunications Union (ITU) ratified H.323 specification, which may define various processes by which voice, video and data may be transported over IP networks for use in VoIP networks. The H.323 specification addresses, for example, delay by providing a prioritization scheme in which delay sensitive traffic may be given processing priority over less delay sensitive traffic. For example, voice and video may be given priority over other forms of data traffic.

The H.323 specification also addresses voice quality by specifying the audio and video coders/decoders (CODECs) that may be utilized for processing a media stream. A CODEC may be a signal processor such as a digital signal processor (DSP) that may be adapted to convert an analog voice and/or video signal into a digital media stream and for converting a digital media stream into an analog voice and/or video signal. In this regard, a coder or encoder portion of the CODEC may convert an analog voice and/or video signal into a digital media stream. Additionally, a decoder portion of the CODEC may convert a digital media stream into an analog voice and/or video signal. Regarding the CODEC for audio signals, the H.323 specification may support recommendations such as ITU-T G.711, G.722, G.723.1, G.728 and G.729 recommendations. The ITU-T G.711 recommendations may support audio coding at 64 Kbps, G.722 may support audio coding at 64 Kbps, 56 kbps and 48 Kbps, G.723.1 may support audio coding at 5.3 Kbps and 6.3 Kbps, G.728 may support audio coding at 16 Kbps and G.729 may support audio coding at 8 Kbps.

The voice quality of a speech CODEC may be dependent on factors such as the type of encoding and/or decoding algorithm utilized by the CODEC. In general, some CODECs may utilize compression algorithms that remove redundant information from the analog signal. Such compression algorithms may permit at least a close replication of an original analog signal. In this case, the bandwidth required for transmitting any resultant signal may be reduced. Other CODECs may utilize algorithms that analyze the signal and retain only those portions that are deemed to be of cognitive importance. These algorithms may reproduce a close approximation to the original signal. Notwithstanding, in this latter case, bandwidth utilization may be superior to the former case where redundant information may be removed. Accordingly, depending on application requirements and hardware limitations, one or more algorithms may be utilized to optimize performance.

Moreover, although economic attractiveness of VoIP have lured network access providers and network transport providers away from traditional circuit switching networks, factors such as the extensiveness of embedded legacy systems and customer demands, for example, have dictated the coexistence of both packet switched and circuit switch networks. Accordingly, new technologies and techniques such as audio and video coding and decoding may be required to support various modes of operation utilized by each system.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a subband acoustic echo canceller with integrated voice activity detection, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a subband acoustic echo canceller with integrated voice activity detection. Exemplary aspects of the invention include adjusting transmit and receive powers of wirelessly communicated audio signals based on integrated voice activity detection. The receive power may be adjusted by receiving the audio signals at a reduced duty cycle. In another embodiment, the receive power may be adjusted by conveying voice activity detection information to selectively disable wireless data packet reception of the wirelessly communicated audio signals. Voice activity detection of the wirelessly communicated audio signals may be accomplished via subband analysis within a subband acoustic echo canceller. A plurality of subbands may be generated for subband analysis utilizing a fast Fourier transform, and a first subset of the subbands corresponding to voice activity may be processed and a second subset of the subbands may be processed that corresponds to background noise. The processing of the subsets may be dynamically adjusted due to variations in the voice activity or background noise. The first subset may be utilized to determine voice activity and comfort noise may be generated and transmitted at a reduced bandwidth utilizing the second subset of the subbands.

Figure 1:
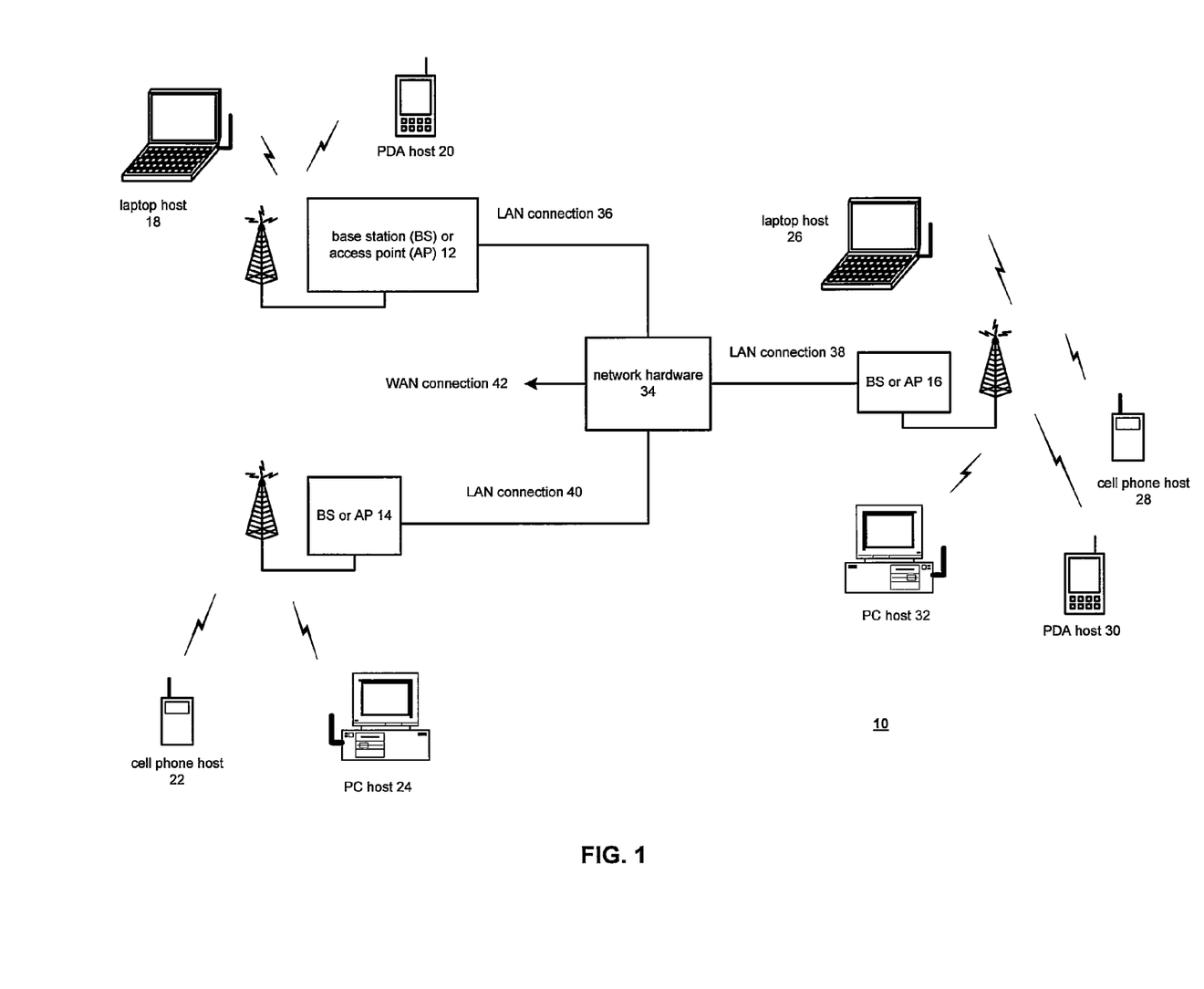
FIG. 1 illustrates a block diagram of a wireless communication system in accordance with an embodiment of the invention.

FIG. 1 illustrates a block diagram of a wireless communication system in accordance with an embodiment of the invention. Referring to FIG. 1, there is shown a block diagram of a communication system 10 that comprises a plurality of base stations and/or access points 12-16, a plurality of wireless communication devices 18-32 and a network hardware component 34. The wireless communication devices 18-32 may comprise laptop computers 18 and 26, personal digital assistants 20 and 30, personal computers 24 and 32 and/or cellular telephones 22 and 28.

The base stations or access points 12-16 may be communicatively coupled to the network hardware 34, for example, via local area network connections 36, 38 and 40. The network hardware 34, for example, a router, switch, bridge, modem, or system controller, may provide a wide area network connection 42 for the communication system 10. Each of the base stations or access points 12-16 may have an associated antenna or antenna array to communicate with the wireless communication devices in its area. Typically, the wireless communication devices may register with a particular base station or access point 12-16 to receive services from the communication system 10. For direct connections, for example, point-to-point communications, wireless communication devices may communicate directly via one or more allocated channels.

Typically, base stations may be used for cellular telephone systems and similar type of systems, while access points may be used for in-home or in-building wireless networks, although those terms are often used interchangeably. Regardless of the particular type of communication system, each wireless communication device may include a built-in radio and/or may be coupled to a radio.

Wireless systems and hands-free/speaker phones may typically suffer from acoustic echoes, which may arise from audio signals transmitted by a speaker in a device being picked up by a microphone on the same device and being re-transmitted. These echoes may be very distracting in a phone conversation. Thus, acoustic echo cancellation may be an important part of a wireless system. Subband acoustic echo cancellation may comprise an advanced form of echo cancellation, where the frequency response of an audio signal may be analyzed, and selection portions of the response may be attenuated to reduce or eliminate echoes.

Another feature that may be integrated into the subband echo canceller, one that may benefit from the subband analysis performed for echo cancellation, may be voice activity detection. Voice activity detection (VAD) may be utilized to reduce transmit/receive power in a wireless device when no voice activity may be present, greatly enhancing power efficiency. By integrating VAD within the subband acoustic echo canceller, both efficiency and performance may be improved, since VAD may be utilizing processes already being performed for echo cancellation, and the transmitter/receiver may be controlled faster with the voice activity detection located at the wireless device on the same chip.

Figure 2A:
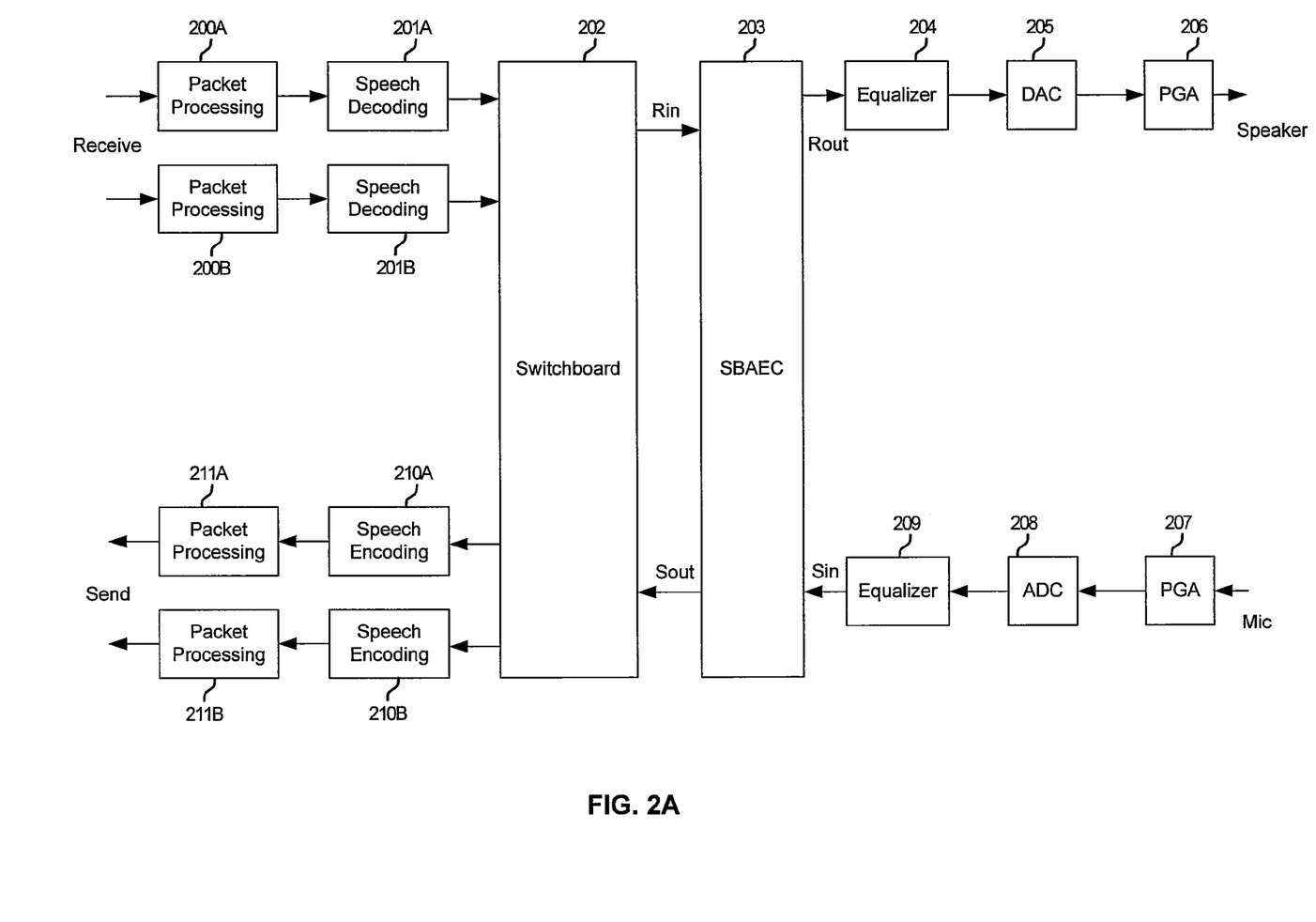
FIG. 2A is a block diagram of an exemplary audio processing system for voice over IP, in accordance with an embodiment of the invention.

FIG. 2A is a block diagram of an exemplary audio processing system for voice over IP, in accordance with an embodiment of the invention. Referring to FIG. 2A, there is shown a plurality of receive packet processing blocks 200a and 200b, a plurality of speech decoding blocks 201a and 201b, a switchboard 202, a subband audio echo canceller (SBAEC) 203, a receive equalizer 204, a digital to analog converter (DAC) 205, a plurality of programmable gain amplifiers (PGAS) 206 and 207, an analog to digital converter (ADC) 208, a send equalizer 209, a plurality of speech encoding blocks 210a and 210b, a plurality of send packet processing blocks 211a and 211b.

The plurality of receive packet processing blocks 200a and 200b may be enabled to receive input signals, for example, audio, video, voice or data signals. The plurality of receive packet processing blocks 200a and 200b may be enabled to convert the input signals into an electronic signal, digitize the electronic signal, and packetize the digital samples. The sampling rate for digitizing the electronic signal may be either 8 kHz, for example, for narrowband or lowband sampling, or 16 kHz, for example, for wideband sampling. Accordingly, narrowband sampling may be bandwidth limited to 4 kHz, for example, while wideband sampling may be bandwidth limited to 8 kHz, for example. The plurality of speech decoding blocks 201a and 201b may be enabled to decode the plurality of received input signals. The plurality of speech decoding blocks 201a and 201b may be enabled to decode each of the lowband and highband components of the plurality of input signals.

The switchboard 202 may comprise suitable circuitry, logic, and/or code that may be enabled to read and write data through a plurality of sample buffer interfaces. The high and low-band sample buffer interfaces may provide data at any arbitrary sampling rate. In an embodiment of the present invention, a low-band sample buffer interface may provide data sampled at 8 kHz, for example, and a high-band sample buffer interface may provide data sampled at 16 kHz, for example. The switchboard 202 may be enabled to receive the plurality of lowband and highband components of the plurality of received input signals and generate an input signal Rin to the SBAEC 203. The switchboard 202 may be enabled to receive an output signal Sout from the SBAEC 203 and generate a plurality of narrowband components and wideband components. The switchboard 202 may be utilized in VoIP applications such as call forwarding, conference calls, and multi-way calls, for example.

The low-band signals or data may be stored as 8 kHz sampled data, for example, while the high-band data may be stored as 16 kHz sampled data, for example. A wideband signal may comprise a combination of lowband and highband components. The lowband and highband components may differ in their ingress and egress sample buffer interface. A wideband component may have useful data at its high and low-band sample buffer interfaces and may comprise both narrowband and wideband services and functions. A narrowband component may comprise useful data at its low-band sample buffer interface and may not have data at its high-band sample buffer interface.

The switchboard 202 may be enabled to interface with narrowband and wideband components through their high and low-band sample buffer interfaces. The switchboard 202 may be incognizant of the wideband or narrowband nature of the components. The switchboard 202 may be enabled to read and write data through the sample buffer interfaces. The high and low-band sample buffer interfaces may provide data at any arbitrary sampling rate. In accordance with an embodiment of the invention, the low-band sample buffer interface may provide data sampled at 8 kHz, for example, and the high-band sample buffer interface may provide data sampled at 16 kHz, for example.

The subband acoustic echo canceller 203 may comprise suitable circuitry, logic, and/or code that may be enabled to receive an input signal Rin from the switchboard 202 and reduce or cancel an echo associated with the input signal Rin based on subband processing of each of the lowband and highband components of the plurality of received input signals. The SBAEC 203 may be enabled to receive an input signal Sin from the equalizer 209 and reduce an echo associated with the input signal Sin based on subband processing of each of the lowband and highband components of the plurality of received input signals.

The equalizer 204 may comprise suitable circuitry, logic, and/or code that may be enabled to receive an output signal Rout from the SBAEC 203 and compensate for an echo associated with the input signal. The equalizer 204 may be enabled to apply a separate gain per subband for the input signal. The equalizer 209 may comprise suitable logic, circuitry, and/or code that may be enabled to compensate for an echo associated with an input signal from, for example, a MIC. The equalizer 209 may be enabled to apply a separate gain per subband for the input signal.

The DAC 205 may comprise suitable circuitry, logic, and/or code that may be enabled to convert the received digital signal from the equalizer 204. The DAC 205 may be enabled to convert the received digital signal to an analog signal and generate an output to the PGA 206. The PGA 206 may comprise suitable circuitry, logic, and/or code that may be enabled to amplify the received analog signal from the DAC 205 and generate an amplified output signal to a speaker.

The PGA 207 may comprise suitable circuitry, logic, and/ or code that may be enabled to amplify a received analog signal from, for example, a microphone and generate an amplified output signal to the ADC 208. The ADC 208 may comprise suitable circuitry, logic, and/or code that may be enabled to convert the received analog signal from the PGA 207. The ADC 208 may be enabled to convert the received analog signal to a digital signal and generate an output to the equalizer 209. The equalizer 209 may comprise suitable circuitry, logic, and/or code that may be enabled to receive an input signal from the ADC 208 and compensate for an echo associated with the input signal. The equalizer 209 may be enabled to compensate for an echo associated with an input signal from a microphone.

The plurality of speech encoding blocks 210a and 210b may be enabled to encode each of the plurality of lowband and highband components of the plurality of received input signals. The plurality of send packet processing blocks 211a and 211b may be enabled to process each of the plurality of lowband and highband components of the plurality of received input signals and generate a plurality of output signals. The plurality of output signals may be, for example, audio, video, voice or data signals. The number of send and receive signals may not be limited to the number shown in FIG. 2A. Accordingly, the number or send and receive signals may be determined by the requirements of the communication systems or the capacity of the switchboard 202.

Figure 2B:
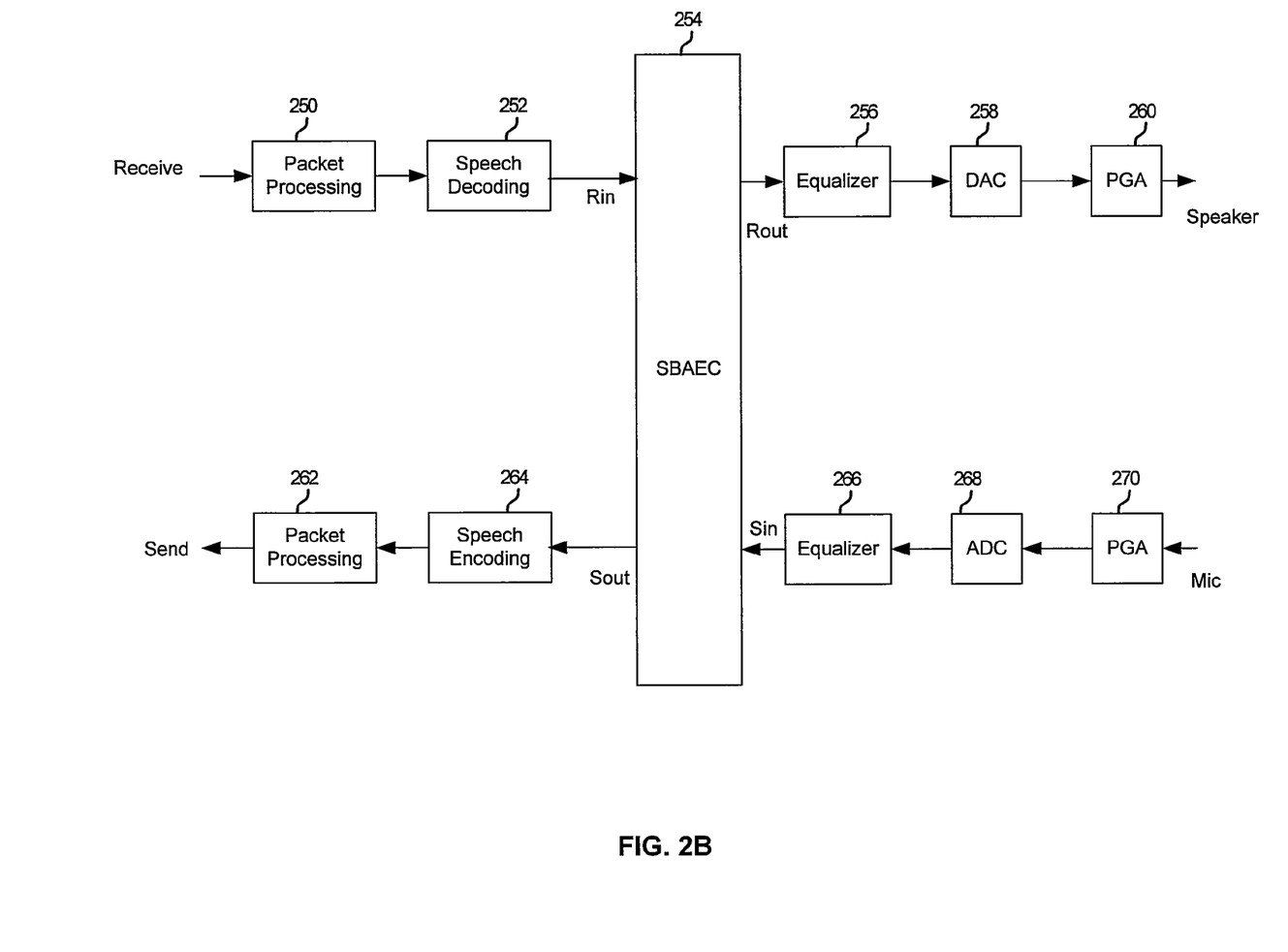
FIG. 2B is a block diagram of an exemplary audio processing system for Bluetooth, in accordance with an embodiment of the invention.

FIG. 2B is a block diagram of an exemplary audio processing system for Bluetooth, in accordance with an embodiment of the invention. Referring to FIG. 2B, there is shown a receive packet processing block 250, a speech decoding block 252, a subband audio echo canceller (SBAEC) 254, a receive equalizer 256, a digital to analog converter (DAC) 258, programmable gain amplifiers (PGA) 260 and 270, an analog to digital converter (ADC) 268, a send equalizer 266, a speech encoding block 264 and a send packet processing block 262.

The receive packet processing block 250, the speech decoding block 252, the equalizers 256 and 266, the DAC 258, the PGAs 260 and 270, the ADC 268, the speech encoding block 264 and the packet processing block 262 may be substantially similar to the corresponding components described with respect to FIG. 2A.

The subband acoustic echo canceller 254 may comprise suitable circuitry, logic, and/or code that may be enabled to receive an input signal Rin from the speech encoding block 252 and reduce or cancel an echo associated with the input signal Rin based on subband processing of each of the lowband and highband components of the received input signals. The SBAEC 254 may be enabled to receive an input signal Sin from the equalizer 266 and reduce an echo associated with the input signal Sin based on subband processing of each of the lowband and highband components of the received input signal.

In operation, the SBAEC 254 may function substantially similar to the SBAEC 203 described with respect to FIG. 2A, but with a single receive channel and a single send channel. Whereas the exemplary embodiment described with respect to FIG. 2A may be utilized in a VoIP system, the exemplary embodiment described here may be utilized for a Bluetooth application, thus eliminating the need for a switchboard, such as the switchboard 202.

Figure 3:
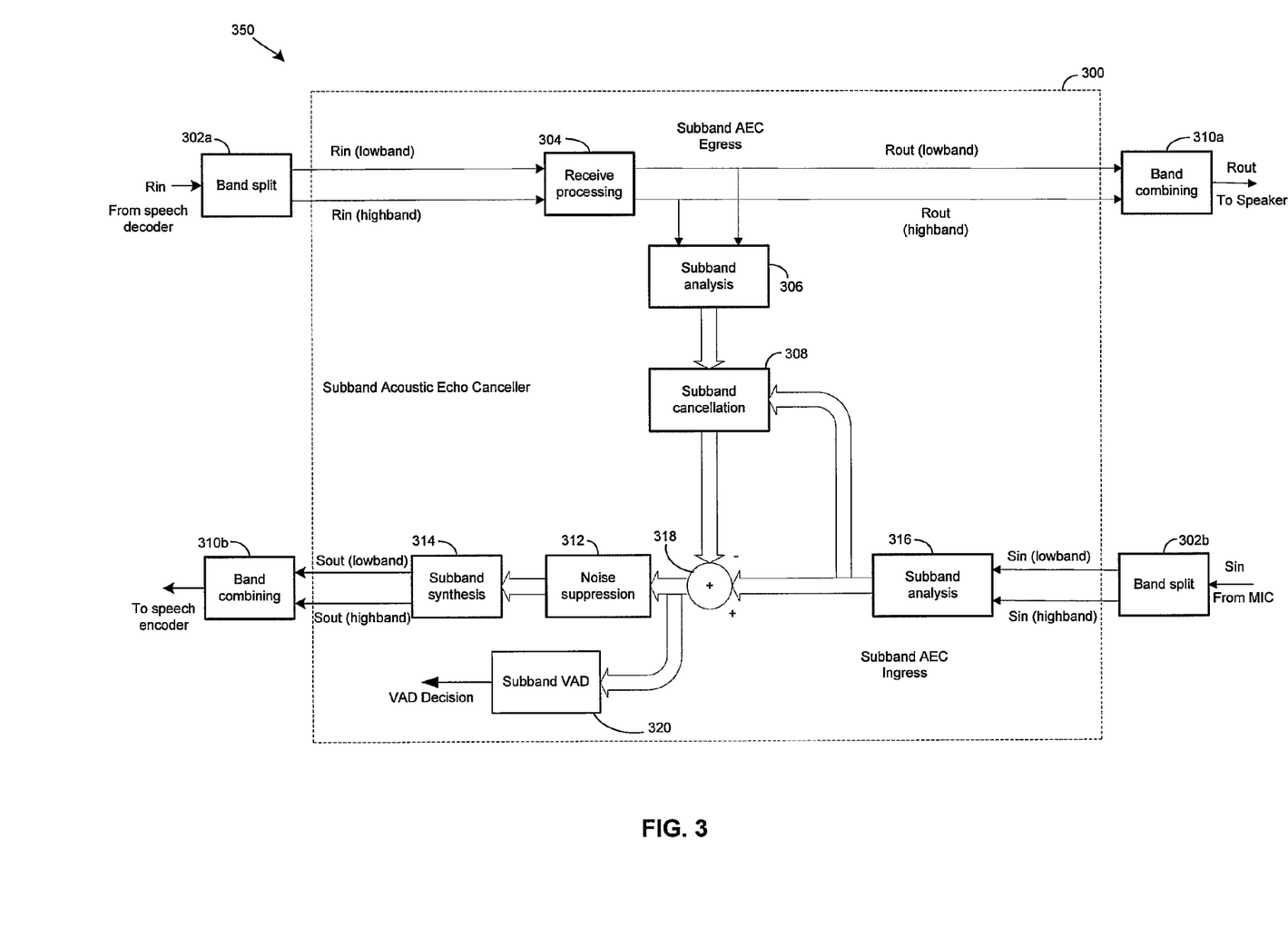
FIG. 3 is a block diagram of an exemplary subband acoustic echo canceller with integrated voice activity detector, in accordance with an embodiment of the invention.

FIG. 3 is a block diagram of an exemplary subband acoustic echo canceller with integrated voice activity detector, in accordance with an embodiment of the invention. Referring to FIG. 3, there is shown a split-band architecture 350. The split-band architecture 350 may comprise a plurality of band split blocks 302a and 302b, a subband acoustic echo canceller 300, and a plurality of band combining blocks 310a and 310b. The subband acoustic echo canceller (SBAEC) 300 may comprise a receive processing block 304, a plurality of subband analysis blocks 306 and 316, a subband cancellation block 308, a subband synthesis block 314, a subband noise suppression block 312, a summer 318 and a subband voice activity detector (VAD) 320.

The band split block 302a may comprise suitable circuitry, logic, and/or code that may be enabled to receive an input signal Rin from a speech decoder, for example, the plurality of speech decoding blocks 201a and 201b, and band split the input signal Rin into a lowband component and a highband component. The input signal Rin may be a wideband signal or a narrowband signal. In instances where the input signal Rin may be a wideband signal, the input signal Rin may be processed in a wideband mode of operation. In the wideband mode of operation, the lowband of the input signal Rin (lowband) and the highband of the input signal Rin (highband) may be processed independently. In instances where the input signal Rin may be a narrowband signal, the input signal Rin may be processed in a narrowband mode of operation. In the narrowband mode of operation, only the lowband of the input signal Rin (lowband) may be processed. In accordance with an embodiment of the invention, the band split block 302a may be enabled to split an input signal into, for example, a 50 Hz to 3.3 kHz lowband component sampled at 8 kHz and a 3.3 kHz to 7 kHz highband component sampled at 16 kHz.

The receive processing block 304 may comprise suitable circuitry, logic, and/or code that may be enabled to receive each of the lowband and highband components of the input signal. During egress of an input signal, the receive processing block 304 may be enabled to process each of the lowband and highband components of the input signal and generate lowband and highband components of an output signal Rout. In the wideband mode of operation, the lowband of the generated output signal Rout (lowband) and the highband of the generated output signal Rout (highband) may be processed independently and communicated to the subband analysis block 306 and the band combining block 310a. In the narrowband mode of operation, only the lowband of the generated output signal Rout (lowband) may be processed and communicated to the subband analysis block 306 and the band combining block 310a.

The band combining block 310a may comprise suitable circuitry, logic, and/or code that may be enabled to receive a lowband component and a highband component of the generated output signal Rout. In the wideband mode of operation, the band combining block 310a may be enabled to combine the lowband of the generated output signal Rout (lowband) and the highband of the generated output signal Rout (highband). In the narrowband mode of operation, the band combining block 310a may be enabled to process the lowband of generated output signal Rout (lowband). The band combining block 310a may be enabled to generate an output signal Rout to a speaker.

The subband analysis block 306 may comprise suitable circuitry, logic, and/or code that may be enabled to receive and process the lowband of the generated output signal Rout (lowband) and the highband of the generated output signal Rout (highband) in the wideband mode of operation. The subband analysis block 306 may be enabled to process the lowband of generated output signal Rout (lowband) in the narrowband mode of operation. The subband analysis block 306 may generate an output signal to the subband cancellation block 308. The subband analysis block 306 may be, for example, a windowed fast Fourier transform (FFT) based subband filter or a multi-delay filter (MDF). The subband analysis block 306 may be enabled to decompose each of the lowband components of the input signal Rin (lowband) and the highband components of the input signal Rin (highband) into a plurality of frequency bands or subbands. The plurality of frequency bands or subbands may be overlapping in the frequency domain. In accordance with an embodiment of the invention, a subband decomposition with 32 bands may be performed on the lowband component and a 16 band decomposition may be performed on the highband component, for example. Since the highband component may have less energy in the first few bands, for example, the first 6 bands, a plurality of the lowbands in the highband components may be discarded. The subband signals may be subsampled independently in the highband and lowband components. In accordance with an embodiment of the invention, the low 32 bands may be sampled at 400 Hz, for example, and the 10 high bands may be sampled at 800 Hz, for example.

The band split block 302b may comprise suitable circuitry, logic, and/or code that may be enabled to receive an input signal Sin from a microphone and band split the input signal Sin into a lowband component and a highband component. The input signal Sin may be a wideband signal or a narrowband signal. In instances where the input signal Sin may be a wideband signal, the input signal Sin may be processed in a wideband mode of operation. In the wideband mode of operation, the lowband of the input signal Sin (lowband) and the highband of the input signal Sin (highband) may be processed independently. In instances where the input signal Sin may be a narrowband signal, the input signal Sin may be processed in a narrowband mode of operation. In the narrowband mode of operation, only the lowband of the input signal Sin (lowband) may be processed. In accordance with an embodiment of the invention, the band split block 302b may be substantially similar to band split block 302a.

The subband analysis block 316 may comprise suitable circuitry, logic, and/or code that may be enabled to receive and process the lowband of the input signal Sin (lowband) and the highband of the input signal Sin (highband) in the wideband mode of operation. The subband analysis block 316 may be enabled to process the lowband of input signal Sin (lowband) in the narrowband mode of operation. The subband analysis block 316 may generate an output signal to the subband cancellation block 308 and the summer 318. In accordance with an embodiment of the invention, the subband analysis block 316 may be substantially similar to the subband analysis block 306.

The subband cancellation block 308 may comprise suitable circuitry, logic, and/or code that may be enabled to receive the subband processed output signals generated from the plurality of subband analysis blocks 306 and 316. The subband cancellation block 308 may be enabled to reduce and/or cancel the echo associated with the input signals Rin and Sin based on subband processing of each of the lowband and highband components of the input signals Rin and Sin. The SBAEC 300 may be enabled to dynamically switch between the wideband mode of operation and the narrowband mode of operation during, for example, a call transfer operation. The subband cancellation block 308 may be enabled to generate an output signal to the summer 318.

The summer 318 may be enabled to subtract the received generated output signal from the subband cancellation block 308 from the output signal generated by the subband analysis block 316 and generate an output signal to the subband noise suppression block 312 and the subband VAD 320. The echo associated with the input signals Rin and Sin may be cancelled and/or reduced in the generated output signal from the summer 318.

The subband noise suppression block 312 may comprise suitable circuitry, logic, and/or code that may be enabled to suppress a noise associated with the input signals Rin and Sin, and may generate an output signal to the subband synthesis block 314. The subband noise suppression block 312 may be enabled to track background noise within the subbands based on the input signals Rin and Sin. In instances where the estimated echo associated with the input signals Rin and Sin may be higher than the background noise associated with the input signals Rin and Sin, the subband noise suppression block 312 may be enabled to stop tracking the background noise upwards. The noise suppression, comfort noise generation (CNG) and/or the echo suppression functionalities may be integrated within the subband acoustic echo canceller 300. The subband noise suppression block 312 may be enabled to implement the noise suppression, CNG and/or the echo suppression functionalities.

The subband synthesis block 314 may comprise suitable circuitry, logic, and/or code that may be enabled to synthesize the received generated output signal from the subband noise suppression block 312. The subband synthesis block 314 may be enabled to generate the lowband and highband components of the processed signal. During ingress of an input signal Sin, the subband synthesis block 314 may be enabled to generate lowband and highband components of an output signal Sout. In the wideband mode of operation, the lowband of the generated output signal Sout (lowband) and the highband of the generated output signal Sout (highband) may be processed independently and communicated to the band combining block 310b. In the narrowband mode of operation, the lowband of the generated output signal Sout (lowband) may be processed and communicated to the band combining block 310b.

The band combining block 310b may comprise suitable circuitry, logic, and/or code that may be enabled to receive a lowband component and a highband component of the generated output signal Sout. In the wideband mode of operation, the band combining block 310b may be enabled to combine the lowband of the generated output signal Sout (lowband) and the highband of the generated output signal Sout (highband). In the narrowband mode of operation, the band combining block 310b may be enabled to process the lowband of generated output signal Sout (lowband). The band combining block 310b may be enabled to generate an output signal Sout to a speech encoder, for example, the plurality of speech encoding blocks 210a and 210b.

The subband VAD 320 may comprise suitable circuitry, logic, and/or code that may be enabled to determine when voice activity may be present in the received signals and generate a VAD decision. The VAD decision information may be utilized to turn off or significantly reduce power of a transmitter/receiver when no voice activity may be present, thus increasing system power efficiency.

The split-band architecture 350 may be characterized by an ingress path and an egress path. The ingress path may transmit user input signals to a network, and the egress path may receive input signals from a network. The ingress path and the egress path may either operate in a wideband mode of operation, or a narrowband mode of operation.

In operation, the SBAEC 300 may receive inputs Rin and Sin and perform echo cancellation on the received signals. The input signals may be analyzed by the subband analysis blocks 306 and 316. The subband analysis blocks 306 and 316 may perform processing algorithms, such as a fast Fourier transform (FFT), on the received signals, and further partition the lowband and highband components into multiple subbands, 32 or 64 subbands, for example. The number of subbands may be variable, and may depend on the amount of signal, or data, in the lowband and highband ranges. The processing of the signals may be applied to selected subbands, determined by the amount of information in the individual subbands. For example, a male speaker may have more information in lower frequencies and a female speaker may have more information in higher frequencies. The processing of particular subbands may be dynamically adjusted to account for differences in signal subband content.

The information derived from the subband analysis blocks 306 and 316 process may be utilized by the subband VAD 320 for voice activity detection. The subband VAD 320 may generate a signal, VAD decision, which may be utilized to reduce power consumption by significantly reducing transmission in instances when no near end voice may be detected, or by reducing receiver power in instances when no far end voice may be detected. The receiving power may be reduced by reducing the duty cycle of the receiver, such that the receiver is on for 50% of the time for example. In an embodiment of the invention, for a Bluetooth® application, the receive power may be reduced by communicating the VAD information on an asynchronous control channel, which may comprise a logical link that carries control protocol for the baseband and physical layers in addition to user data. In instances where no voice activity is detected, this VAD information may selectively disable the wireless data packet reception of the received signal.

The subband analysis performed on the received signals may also be utilized to reduce processing power when the subband 320 indicates no voice activity. The SBAEC 300 may determine a noise level, such that comfort noise generation (CNG) may be transmitted with reduced bandwidth. This may be accomplished by selecting samples of a small number of appropriate subbands when the subband VAD 320 determines that there may be no voice activity at a particular time. The levels of only selected bands may be transmitted, in particular those associated with the noise levels sensed at the source and determined by the subband analysis. In this manner, the subband analysis blocks 306 and 316 may enable the generation of a compressed noise signal, thus reducing processing and bandwidth requirements.

In addition, the processing power may be reduced by disabling speech encoding, performed by the speech encoding blocks 210a and 210b described with respect to FIG. 2A, and/or by disabling speech decoding, performed by the speech decoding blocks 201a and 201b, also described with respect to FIG. 2A, when no voice activity may be detected.

By integrating the subband VAD 320 within the SBAEC 300, the response time between when a decision may be made that no voice is detected and when the decision may be implemented, such as by reducing transmit/receive power, for example, may be significantly reduced as compared to conventional VAD systems. Conventional systems may place the VAD at the source, such as at a microphone, or at a base station, increasing the distance between where a decision may be made and where it may be implemented.

In a wireless transmission, the highest quality and lowest power and processor requirements may be accomplished if both the near end and the far end incorporate the disclosed invention, but in another aspect of the invention, a standalone VAD may be enabled to detect voice and generate comfort noise. The subband decomposition for a standalone VAD may have minimal delay since there may be no need for signal reconstruction, and subband comfort noise generation may also have minimal delay since there may be no required signal analysis.

Figure 4:
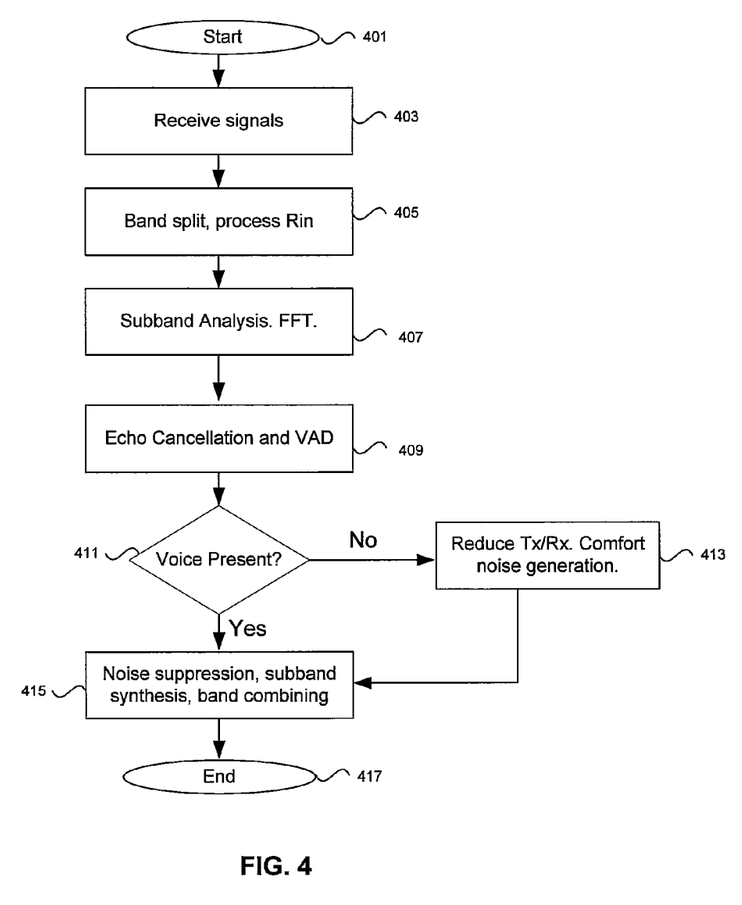
FIG. 4 is a flow diagram illustrating an exemplary subband acoustic echo cancellation with integrated voice activity detection process, in accordance with an embodiment of the invention.

FIG. 4 is a flow diagram illustrating an exemplary subband acoustic echo cancellation with integrated voice activity detection process, in accordance with an embodiment of the invention. Referring to FIG. 4, after start step 401, in step 403 signals may be received, Rin from a microphone or Sin from a speech decoder. In step 405, the signal may be split into a lowband and a highband, and the Rin signal may be processed prior to being communicated to subband analysis in step 407. The subband analysis may comprise an FFT applied to the signals to partition the signals into subbands to determine the spectral response of the signals. In this manner, echo cancellation and VAD may be performed in step 409. In step 411, if voice activity is detected by the VAD, the process may proceed to step 415 for noise suppression, subband synthesis and band combining. If no voice activity is detected, in step 413, the transmit/receive powers may be reduced and comfort noise may be generated to reduce power consumption and processor usage, before proceeding to step 415 for noise suppression, subband synthesis and band combining.

In an embodiment of the invention, a method and system are disclosed for adjusting transmit and/or receive powers of wirelessly communicated audio signals based on voice activity detection via subband analysis of the wirelessly communicated audio signals. The receive power may be adjusted by utilizing a reduced duty cycle, or by conveying voice activity detection information via an asynchronous control channel in a Bluetooth application. A plurality of subbands may be generated utilizing a fast Fourier transform, and a first subset of the subbands corresponding to voice activity may be selected and a second subset of the subbands may be selected that corresponds to background noise. The processing of the subsets may be dynamically adjusted due to variations in the voice activity or background noise. Comfort noise may be generated and transmitted at a reduced bandwidth utilizing the second subset of the subbands Certain embodiments of the invention may comprise a machine-readable storage having stored thereon, a computer program having at least one code section for communicating information within a network, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for a wireless system control, the method comprising:
   in a receiver:

while receiving wirelessly communicated audio signals, determining a voice activity based on a subband analysis of said wirelessly communicated audio signals;

adjusting an amount of power used for a wireless reception in said receiver based on said voice activity;

generating a plurality of subbands for said subband analysis;

processing a second subset of said plurality of subbands; and generating a comfort noise based on said processed second subset of said plurality of subbands.

2. The method according to claim 1, wherein said adjusting comprises reducing a duty cycle for receiving said wirelessly communicated audio signals.

3. The method according to claim 1, wherein said adjusting comprises:

conveying voice activity detection information via an asynchronous control channel for wireless communications; and selectively disabling a wireless data packet reception of said wirelessly communicated audio signals based on said voice activity detection information.

4. The method according to claim 1, wherein said adjusting comprises adjusting an amount of power used for a wireless transmission in said receiver based on said voice activity.

5. The method according to claim 4, comprising performing said subband analysis based on egress and ingress echo cancellation subband analysis information within a subband acoustic echo canceller.

6. The method according to claim 1, comprising generating the plurality of subbands for said subband analysis utilizing a fast Fourier transform.

7. The method according to claim 6, comprising processing a first subset of said plurality of subbands, said first subset of said plurality of subbands corresponding to the voice activity in said wirelessly communicated audio signals.

8. The method according to claim 7, comprising dynamically adjusting said processing to correspond to variations in said voice activity in said wirelessly communicated audio signals.

9. The method according to claim 7, comprising determining the voice activity in said wirelessly communicated audio signals based on said first subset of said plurality of subbands.

10. The method according to claim 6, wherein said second subset of said plurality of subbands corresponds to a background noise in said wirelessly communicated audio signals.

11. The method according to claim 10, comprising dynamically adjusting said processing to correspond to variations in said background noise in said wirelessly communicated audio signals.

12. The method according to claim 1, transmitting said comfort noise utilizing a reduced bandwidth.

13. A system for a wireless system control, the system comprising:

a receiver that handles processing of wirelessly communicated audio signals, said receiver comprising:

acoustic echo canceller circuitry operable to, while receiving wirelessly communicated audio signals, determining a voice activity based on a subband analysis of wirelessly communicated audio signals;

generating a plurality of subbands for said subband analysis;

processing a second subset of said plurality of subbands; and generating a comfort noise based on said second subset of said plurality of subbands; and communications circuitry operable to adjust an amount of power used for a wireless reception in said receiver based on said voice activity.

14. The system according to claim 13, wherein said communications circuitry is further operable to reduce a duty cycle for receiving said wirelessly communicated audio signals.

15. The system according to claim 13, wherein said communications circuitry is further operable to:

convey voice activity detection information via an asynchronous control channel for wireless communications; and selectively disable a wireless data packet reception of said wirelessly communicated audio signals based on said voice activity detection information.

16. The system according to claim 13, wherein said communications circuitry is further operable to adjust an amount of power used for a wireless transmission in said receiver based on said voice activity.

17. The system according to claim 13, wherein said acoustic echo canceller circuitry is further operable to generate the plurality of subbands for said subband analysis utilizing a fast Fourier transform.

18. The system according to claim 17, wherein said acoustic echo canceller circuitry is further operable to process a first subset of said plurality of subbands, said first subset of said plurality of subbands corresponding to the voice activity in said wirelessly communicated audio signals.

19. The system according to claim 18, wherein said acoustic echo canceller circuitry is further operable to dynamically adjust said processing to correspond to variations in said voice activity in said wirelessly communicated audio signals.

20. The system according to claim 18, wherein said acoustic echo canceller circuitry is further operable to determine the voice activity in said wirelessly communicated audio signals based on said first subset of said plurality of subbands.

21. The system according to claim 17, wherein said second subset of said plurality of subbands corresponds to background noise in said wirelessly communicated audio signals.

22. The system according to claim 21, wherein said acoustic echo canceller circuitry is further operable to dynamically adjust said processing to correspond to variations in said background noise in said wirelessly communicated audio signals.

23. The system according to claim 13, wherein said acoustic echo canceller circuitry is further operable to transmit said comfort noise utilizing a reduced bandwidth.

24. A non-transitory computer readable storage having stored thereon, a computer program having at least one code section, the at least one code section being executable by a machine for causing the machine to perform a method for a wireless system control, comprising:

in a receiver:

while receiving wirelessly communicated audio signals, determining a voice activity based on a subband analysis of received wirelessly communicated audio signals;

adjusting an amount of power used for a wireless reception in said receiver based on said voice activity;

generating a plurality of subbands for said subband analysis;

processing a second subset of said plurality of subbands; and generating a comfort noise based on said processed second subset of said plurality of subbands.

25. The non-transitory computer readable storage according to claim 24, wherein said adjusting comprises reducing a duty cycle for receiving said wirelessly communicated audio signals.

26. The non-transitory computer readable storage according to claim 24, wherein said adjusting comprises:
conveying voice activity detection information via an asynchronous control channel for wireless communications; and
selectively disabling a wireless data packet reception of said wirelessly communicated audio signals based on said voice activity detection information.

27. The non-transitory computer readable storage according to claim 24, wherein said adjusting comprises adjusting an amount of power used for a wireless transmission in said receiver based on said voice activity.

28. The non-transitory computer readable storage according to claim 27, the method comprising performing said subband analysis based on egress and ingress echo cancellation subband analysis information within a subband acoustic echo canceller.

29. The non-transitory computer readable storage according to claim 24, the method comprising generating the plurality of subbands for said subband analysis utilizing a fast Fourier transform.

30. The non-transitory computer readable storage according to claim 29, the method comprising processing a first subset of said plurality of subbands, said first subset of said plurality of subbands corresponding to the voice activity in said wirelessly communicated audio signals.

31. The non-transitory computer readable storage according to claim 30, the method comprising dynamically adjusting said processing to correspond to variations in said voice activity in said wirelessly communicated audio signals.

32. The non-transitory computer readable storage according to claim 30, the method comprising determining the voice activity in said wirelessly communicated audio signals based on said first subset of said plurality of subbands.

33. The non-transitory computer readable storage according to claim 29, wherein said second subset of said plurality of subbands corresponds to background noise in said wirelessly communicated audio signals.

34. The non-transitory computer readable storage according to claim 33, the method comprising dynamically adjusting said processing to correspond to variations in said background noise in said wirelessly communicated audio signals.

35. The non-transitory computer readable storage according to claim 24, the method comprising transmitting said comfort noise utilizing a reduced bandwidth.

* * * * *